(12) United States Patent
Ou et al.

(10) Patent No.: US 8,306,586 B2
(45) Date of Patent: Nov. 6, 2012

(54) HANDHELD ELECTRONIC DEVICE

(75) Inventors: Tsung-Yuan Ou, Taoyuan County (TW); Chih-Wei Tai, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 147 days.

(21) Appl. No.: 13/013,838

(22) Filed: Jan. 26, 2011

(65) Prior Publication Data

US 2012/0028693 A1 Feb. 2, 2012

(30) Foreign Application Priority Data

Jul. 29, 2010 (TW) .............................. 99125135 A

(51) Int. Cl.
*H04M 1/00* (2006.01)
(52) U.S. Cl. ............... 455/575.4; 455/90.3; 455/550.1; 455/575.1; 455/575.3; 361/679.56; 361/679.55
(58) Field of Classification Search ............... 455/90.3, 455/550.1, 566, 575.1, 575.3, 575.4; 361/679.56, 361/679.55
See application file for complete search history.

(56) References Cited

U.S. PATENT DOCUMENTS

| | | | |
|---|---|---|---|
| 7,076,058 B2 * | 7/2006 | Ikeuchi et al. | 379/433.12 |
| 7,539,526 B2 * | 5/2009 | Pirila et al. | 455/575.3 |
| 7,627,337 B2 | 12/2009 | Maatta et al. | |
| 7,813,775 B2 * | 10/2010 | Hyun et al. | 455/575.3 |
| 7,848,786 B2 * | 12/2010 | Liu et al. | 455/575.1 |
| 2008/0311963 A1 * | 12/2008 | Strawn | 455/575.1 |
| 2010/0085274 A1 * | 4/2010 | Kilpatrick et al. | |
| 2010/0259463 A1 | 10/2010 | Sip et al. | |
| 2011/0195752 A1 * | 8/2011 | Siddiqui et al. | 455/566 |

FOREIGN PATENT DOCUMENTS

| | | |
|---|---|---|
| EP | 2175619 | 4/2010 |
| EP | 2194693 | 6/2010 |
| WO | 2009034907 | 3/2009 |
| WO | 2010023354 | 3/2010 |

OTHER PUBLICATIONS

"European Search Report of Europe Counterpart Application", issued on Oct. 17, 2011, p. 1-p. 4.
"Office Action of European Counterpart Application", issued on Jan. 16, 2012, p. 1-p. 4.

* cited by examiner

*Primary Examiner* — Olumide T Ajibade Akonai
(74) *Attorney, Agent, or Firm* — Jianq Chyun IP Office

(57) ABSTRACT

A handheld electronic device includes first, second and third bodies, a rod, and an elevating mechanism disposed on the first body. The rod has a first end, a second end, and a pivot portion pivotably mounted to the first body. The second body is slidably disposed on the first body and coupled to the first end. The second body is stacked between the first body and the third body. The third body is slidably disposed on the elevating mechanism and coupled to the rod. When the third body moves relative to the first body, the second body is driven by the first rod to move relative to the first body in an opposite direction, such that the second body is exposed out of the third body and the third body is descended by the elevating mechanism to move toward the first body.

14 Claims, 11 Drawing Sheets

Section E-E

Section G-G

HANDHELD ELECTRONIC DEVICE

CROSS-REFERENCE TO RELATED APPLICATION

This application claims the priority benefit of Taiwan application serial No. 99125135, filed on Jul. 29, 2010. The entirety of the above-mentioned patent application is hereby incorporated by reference herein and made a part of this specification.

BACKGROUND OF THE INVENTION

1. Field of the Invention

The present application relates to an electronic device, and more particularly, to a handheld electronic device.

2. Description of Related Art

Following the development of information technology, desired information is easier and easier to acquire from electronic devices in daily life. On the other hand, various types of handheld electronic devices trend toward being light, thin, short and small. Due to the characteristic and advantage of being easy to carry, the electronic devices have been widely accepted and used in daily life.

Taking the mobile phone as an example, in order for the mobile phone to be easily carried and satisfy various preferences and needs, there have been flip-type, rotation-type and slide-type mobile phones in addition to the traditional bar-type mobile phone. As far as the slide-type mobile phone is concerned, it consists of stacked upper and lower bodies that can slide relative to each other between spread and retracted states. Stacking the upper and lower bodies can help reduce the overall size, and the upper and lower bodies can be slid to the spread state in a particular operation mode. Following the development of touch-control display technology, the touch control display function of the mobile phone is being used to gradually replace the traditional key pad function. Therefore, it would be desirable to provide a mobile phone body having limited space with a larger available display area.

SUMMARY OF THE INVENTION

Accordingly, the present application is directed to a handheld electronic device which has a larger available display area and has a greater flexibility in configuring various components of the handheld electronic device.

The present application provides a handheld electronic device, which includes a first body, a first rod, a second body, an elevating mechanism, and a third body. The first rod has a first end, a second end, and a pivot portion. The pivot portion is positioned between the first end and the second end and is pivotably mounted to the first body. The second body is slidably disposed on the first body and is coupled to the first end. The elevating mechanism is disposed on the first body. The third body is slidably disposed on the elevating mechanism and is coupled to the first rod. The second body is stacked between the first body and the third body when the handheld electronic device is in a retracted state. When the third body moves relative to the first body in a first operation direction to drive the first rod to pivot, the second body is driven by the first rod to move relative to the first body in a second operation direction opposite to the first operation direction, such that the second body is exposed out of the third body. When the second body is exposed out of the third body, the third body is descended by the elevating mechanism to move toward the first body, such that the handheld electronic device turns into a spread state.

In view of the foregoing, in embodiments of the present invention, the second body is stacked between the first body and the third body, and the third body can drive the second body to move by using a linkage mechanism such that the third body and the second body can move in opposite directions to expose the second body out of the third body. The third body then can descend to move toward the first body by using an elevating mechanism, such that the third body and the second body are connected to provide the handheld electronic device with a larger available display area. In addition, magnetic elements may be disposed on the first and second bodies, respectively, to provide a magnetic force to position the third body. Elastic members may further be disposed between the base and link rods of the linkage mechanism to provide an elastic force to drive the linkage mechanism to operate thus facilitating the operation of the handheld electronic device.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

Figure 1A:
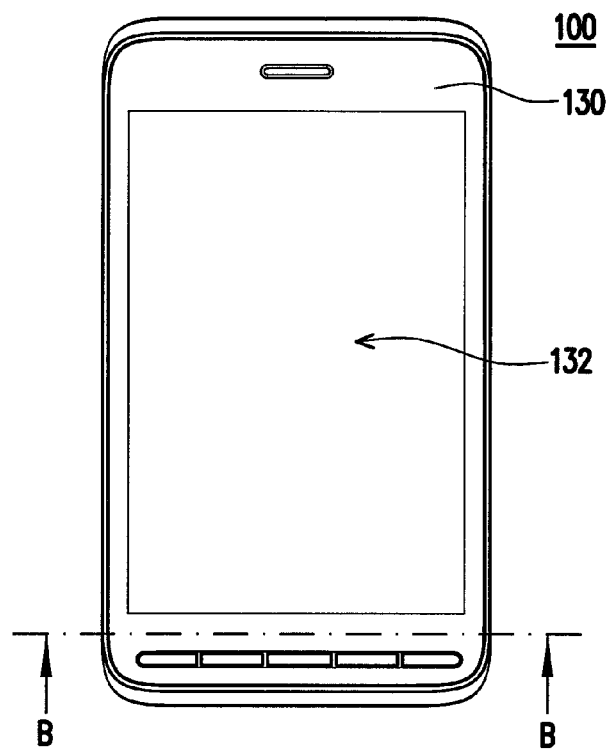
FIG. 1A to FIG. 1F are operational views of a handheld electronic device according to one embodiment of the present invention.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purposes of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

FIG. 1A to FIG. 1F are operational views of a handheld electronic device according to one embodiment of the present invention. FIG. 2A illustrates a cross sectional view of the handheld electric device of FIG. 1A taken along line B-B thereof and a side view of FIG. 1A. FIG. 2B illustrates a cross sectional view of the handheld electric device of FIG. 1B taken along line A-A thereof and a side view of FIG. 1B. FIG. 2C illustrates a cross sectional view of the handheld electric device of FIG. 1C taken along line C-C thereof and a side view of FIG. 1C. FIG. 2D illustrates a cross sectional view of the handheld electric device of FIG. 1D taken along line D-D thereof and a side view of FIG. 1D. FIG. 2E illustrates a cross sectional view of the handheld electric device of FIG. 1E taken along line E-E thereof and a side view of FIG. 1E. FIG. 2F illustrates a cross sectional view of the handheld electric device of FIG. 1F taken along line G-G thereof and a side view of FIG. 1F. FIG. 3A to FIG. 3F are partial, perspective views of the handheld electronic device of FIG. 1A to FIG. 1F, respectively. FIG. 4 is an exploded view of the handheld electronic device of FIG. 1.

Referring to FIG. 1A, FIG. 2A, FIG. 3A and FIG. 4, the handheld electronic device 100 of the present embodiment includes a first body 110, a second body 120, a third body 130, a first rod 140 (two first rods 140 are illustrated in FIG. 4 as well as in FIG. 3B and FIG. 3F), and an elevating mechanism 150. The first rod 140 includes a first end 142, a second end 144, and a pivot portion 146 (labelled in FIG. 4). The pivot portion 146 is located between the first end 142 and the second end 144 and is pivotably connected to the first body 110. The second body 120 is slidably disposed on the first body 110 and is coupled to the first end 142 of the first rod 140. The elevating mechanism 150 is disposed on the first body 110. The third body 130 is slidably disposed on a top of the elevating mechanism 150 and is coupled to the first rod 140. The second body 120 is stacked between the first body 110 and the third body 130 when the handheld electronic device 100 is in a retracted state (as shown in FIG. 2A).

Figure 1B:
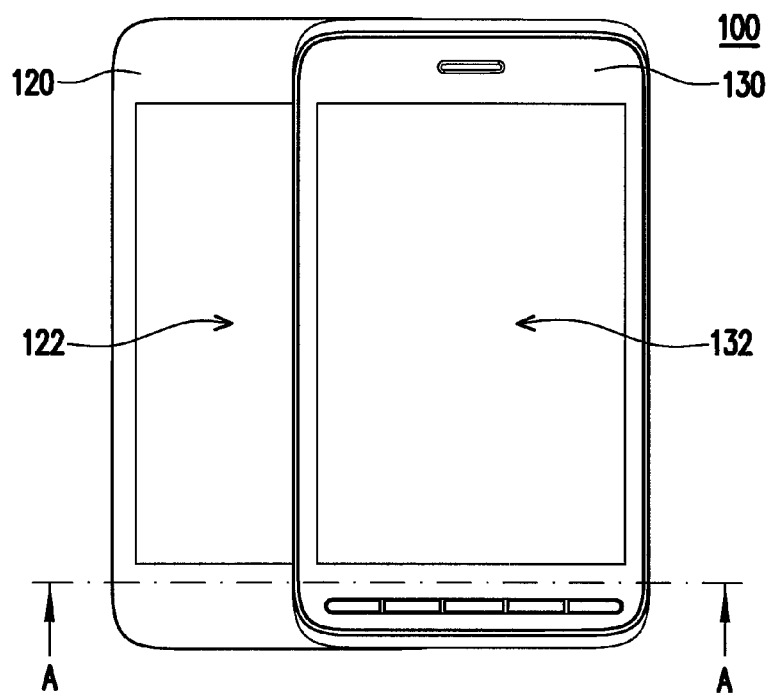
Figure 1C:
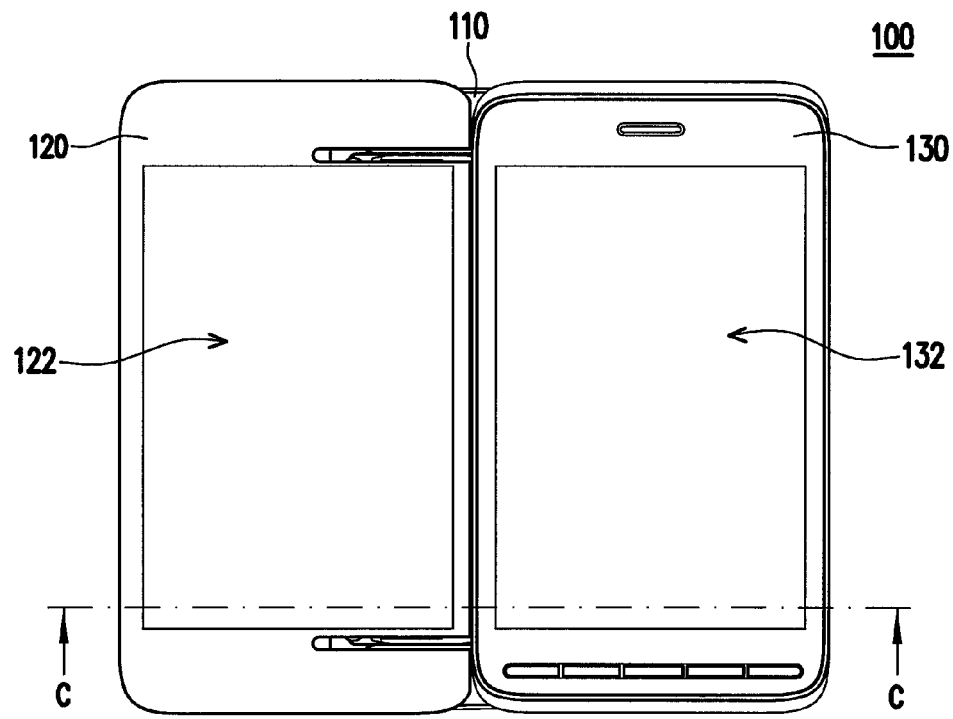
Figure 2A:
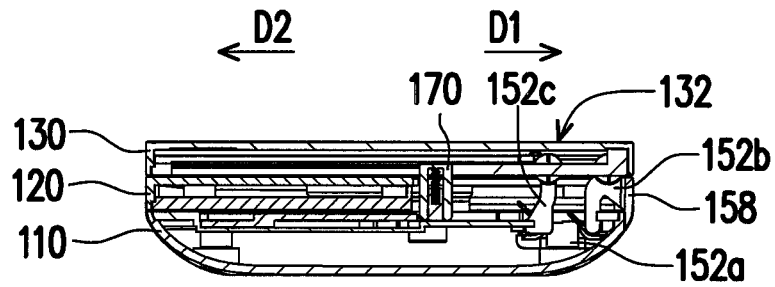
FIG. 2A illustrates a cross sectional view of the handheld electric device of FIG. 1A taken along line B-B thereof and a side view of FIG. 1A.
Figure 2A:
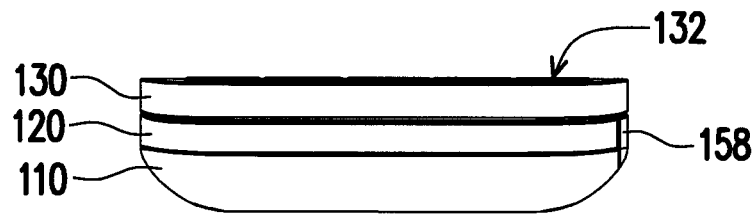
Figure 2B:
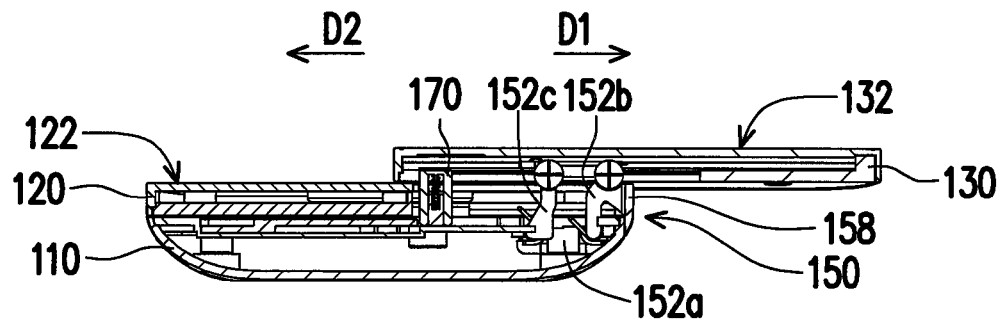
FIG. 2B illustrates a cross sectional view of the handheld electric device of FIG. 1B taken along line A-A thereof and a side view of FIG. 1B.
Figure 2B:
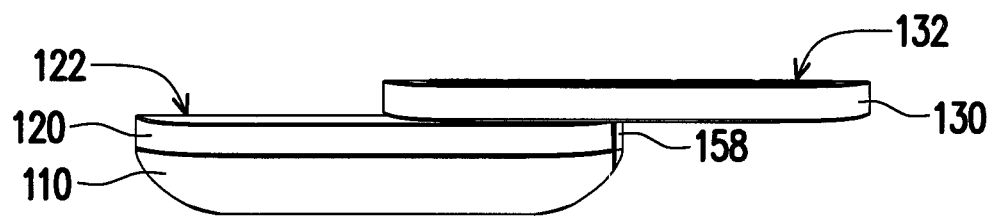
Figure 2C:
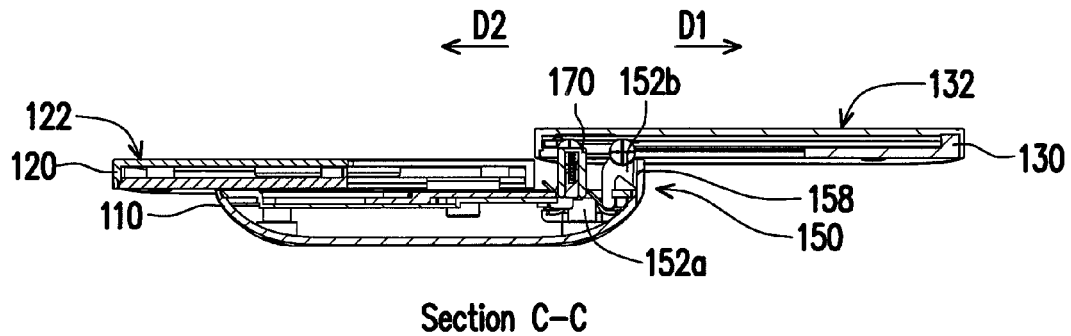
FIG. 2C illustrates a cross sectional view of the handheld electric device of FIG. 1C taken along line C-C thereof and a side view of FIG. 1C.
Figure 2C:
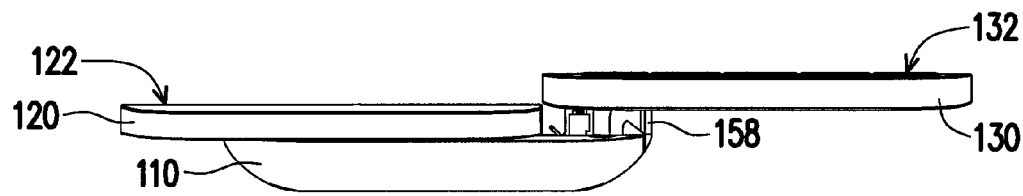
Figure 2D:
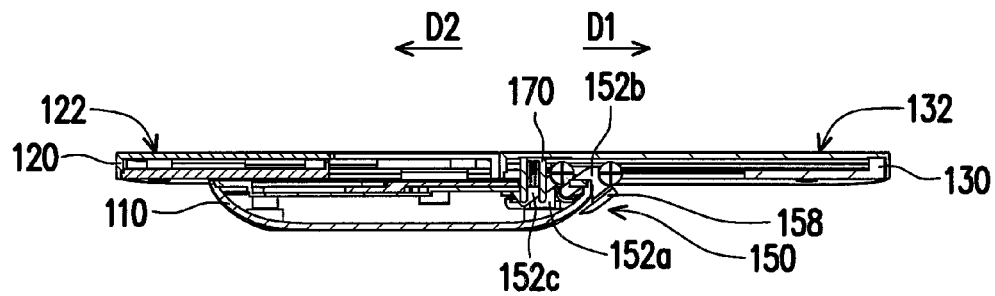
FIG. 2D illustrates a cross sectional view of the handheld electric device of FIG. 1D taken along line D-D thereof and a side view of FIG. 1D.
Figure 2D:
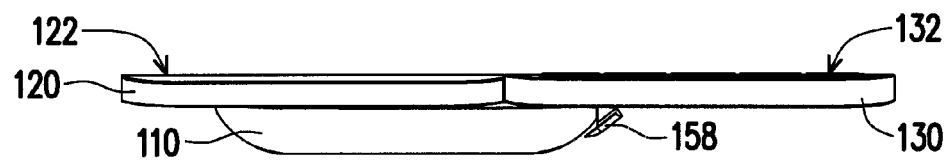
Figure 2E:
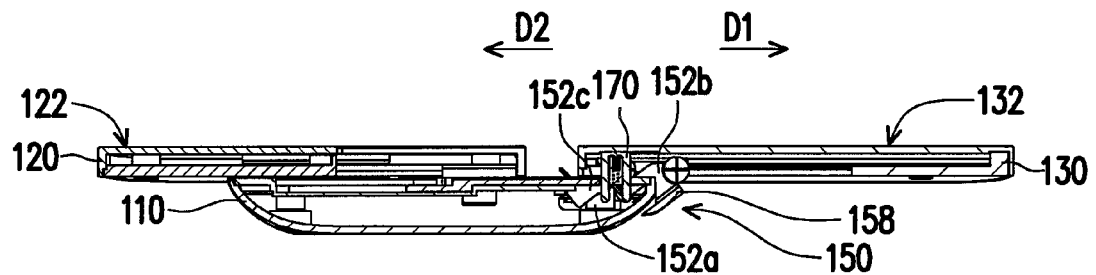
FIG. 2E illustrates a cross sectional view of the handheld electric device of FIG. 1E taken along line E-E thereof and a side view of FIG. 1E.
Figure 2E:
Figure 2F:
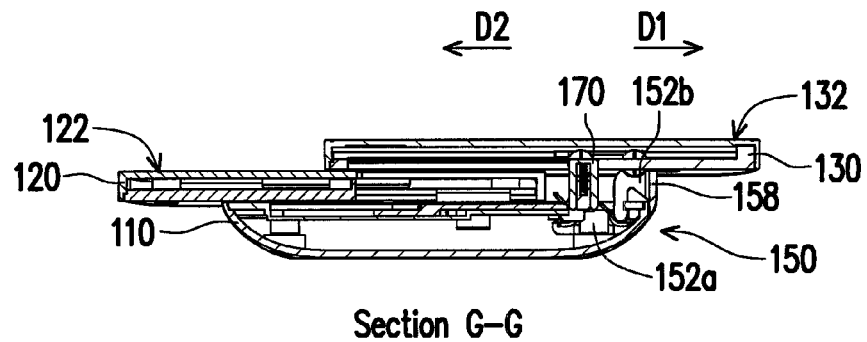
FIG. 2F illustrates a cross sectional view of the handheld electric device of FIG. 1F taken along line G-G thereof and a side view of FIG. 1F.
Figure 2F:
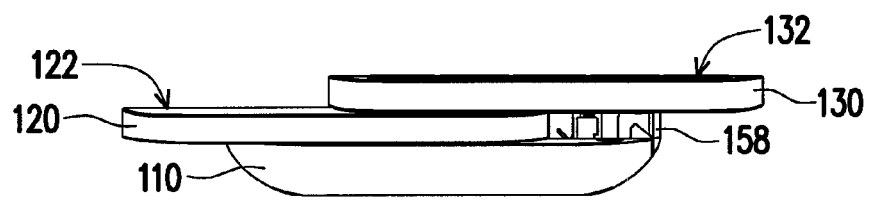
Figure 3A:
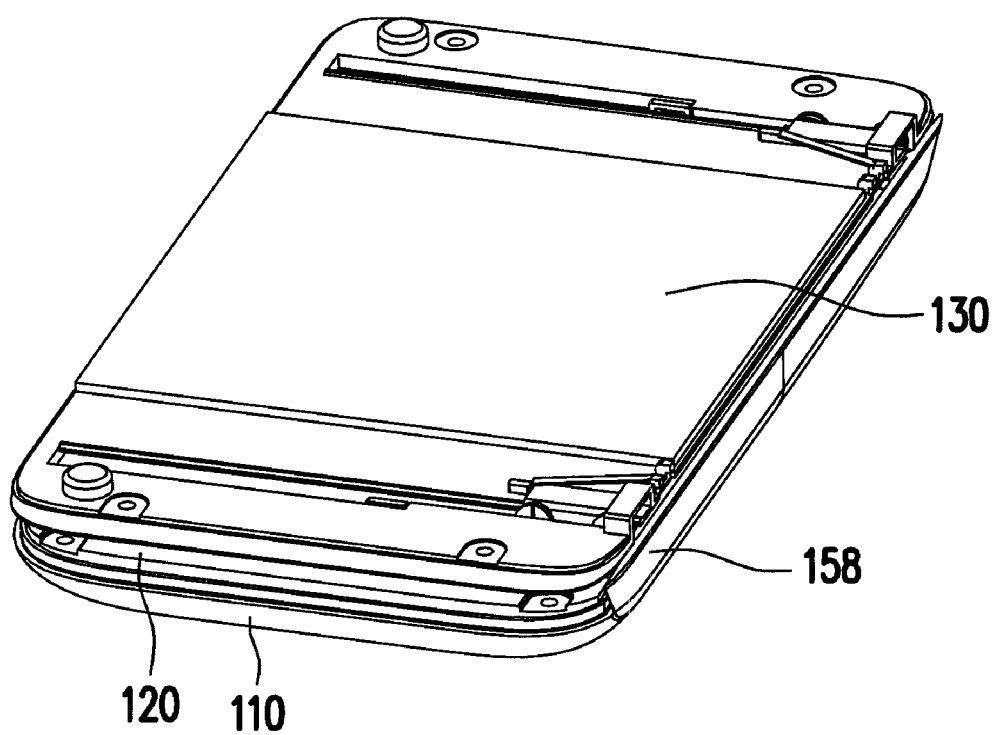
FIG. 3A to FIG. 3F are partial, perspective views of the handheld electronic device of FIG. 1A to FIG. 1F, respectively.
Figure 3B:
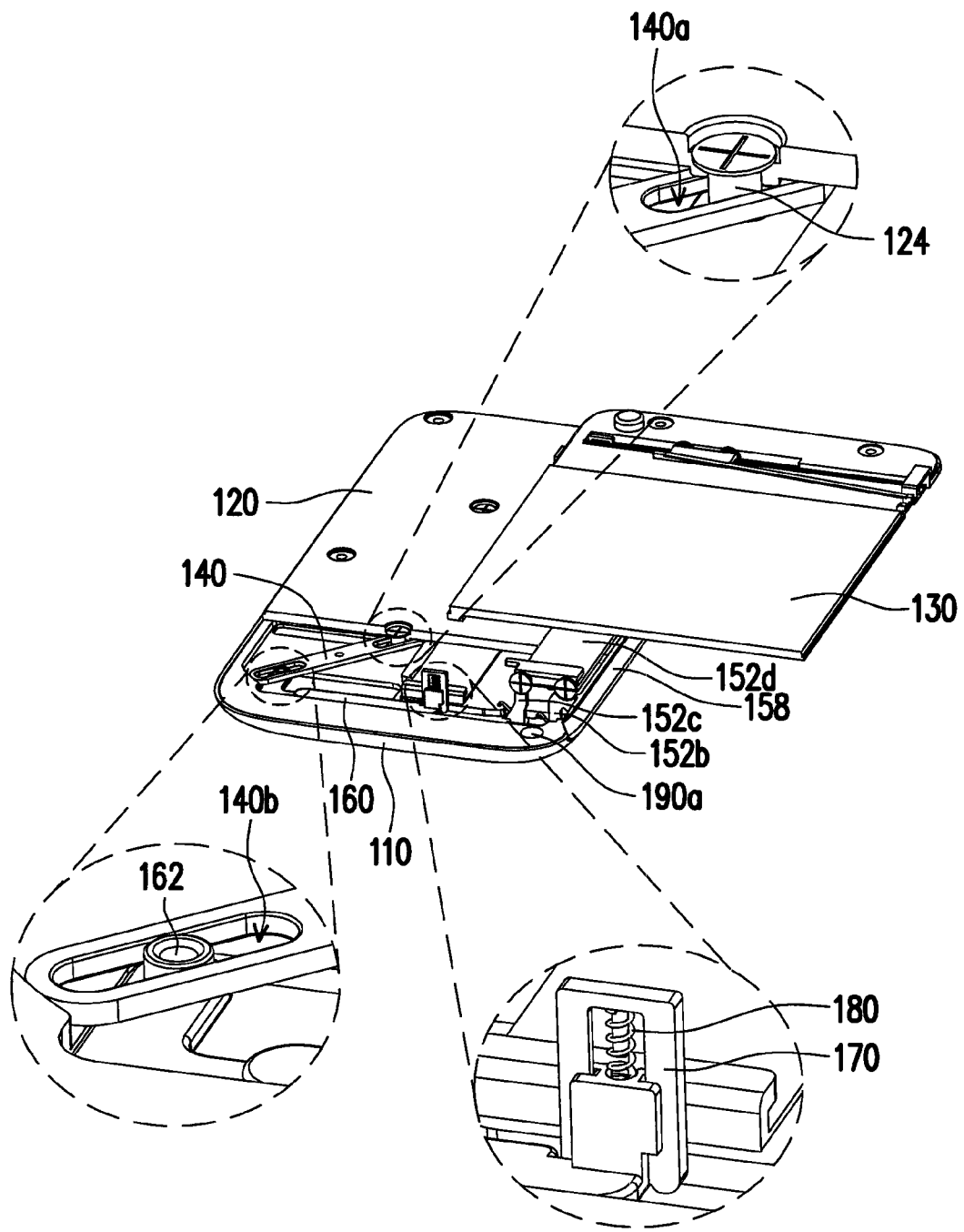

The user may push the third body 130 to move relative to the first body 110 in a first operation direction D1, causing the electronic device to change from the states shown in FIG. 1A, FIG. 2A and FIG. 3A to the states shown in FIG. 1B, FIG. 2B and FIG. 3B, such that the second body 120 is partially exposed out of the third body 130. The user may then continue pushing the third body 130 to move relative to the first body 110 in the first operation direction D1 so as to drive the first rod 140 to pivot. At this time, the second body 120 is driven by the first rod 140 to move relative to the first body 110 in a second operation direction D2 opposite to the first operation direction D1, causing the electronic device to change from the states shown in FIG. 1B, FIG. 2B and FIG. 3B to the states shown in FIG. 1C, FIG. 2C and FIG. 3C, such that the second body 120 is completely exposed out of the third body 130.

Figure 1D:
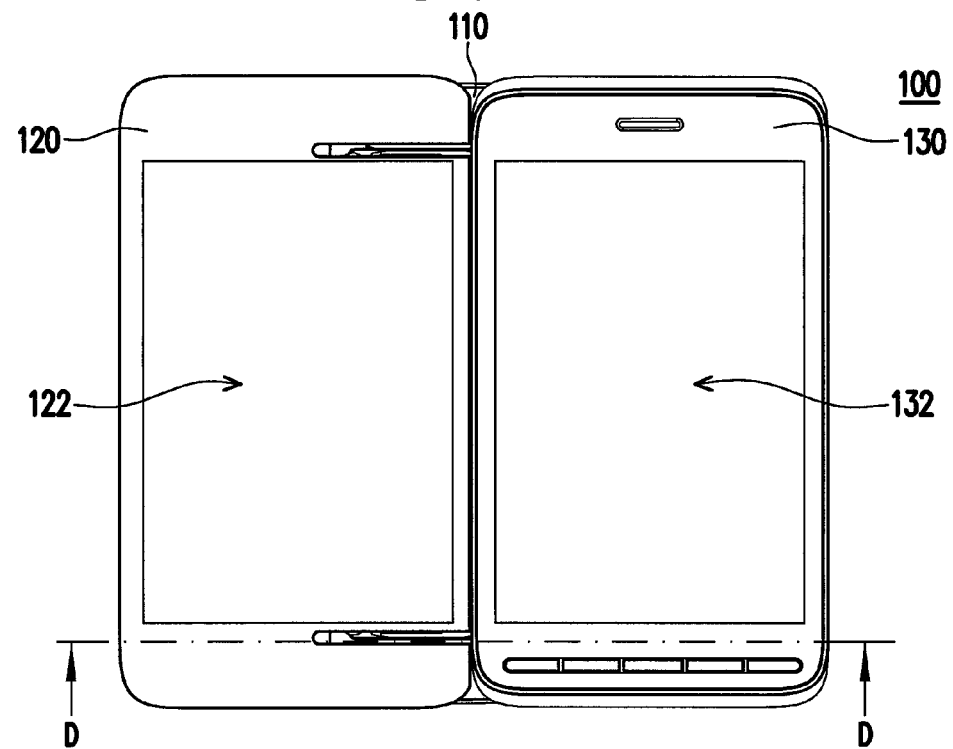
Figure 1E:
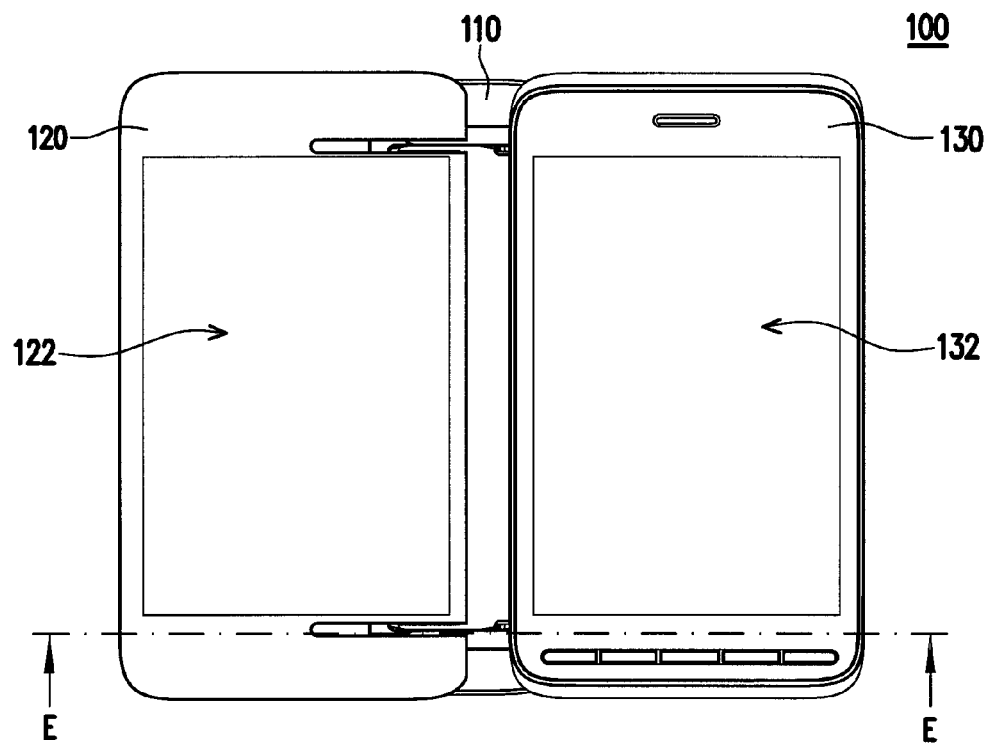
Figure 1F:
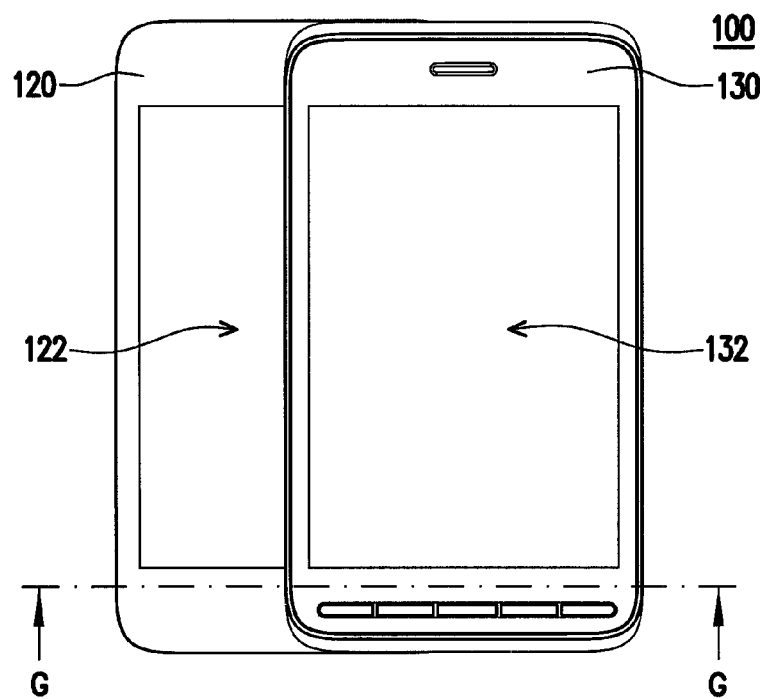
Figure 3C:
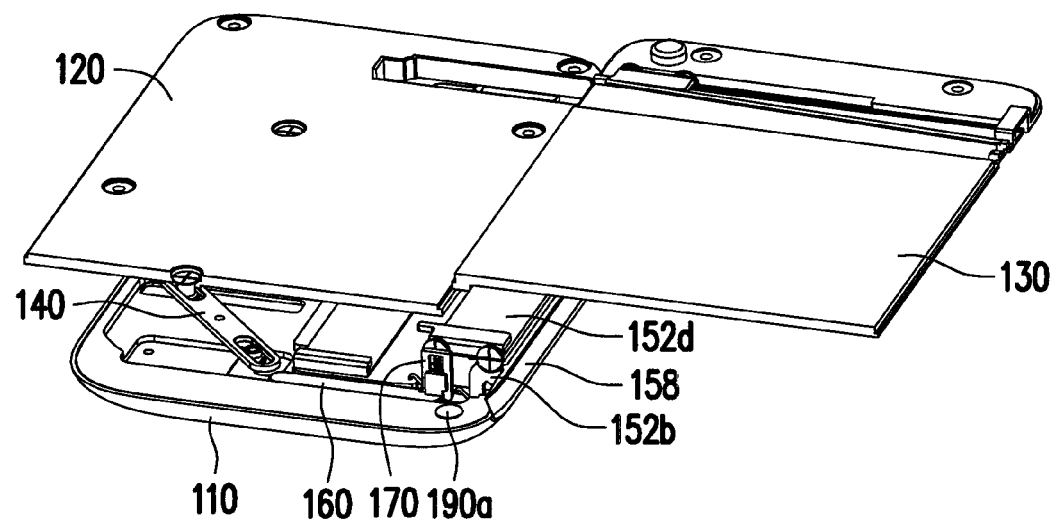
Figure 3D:
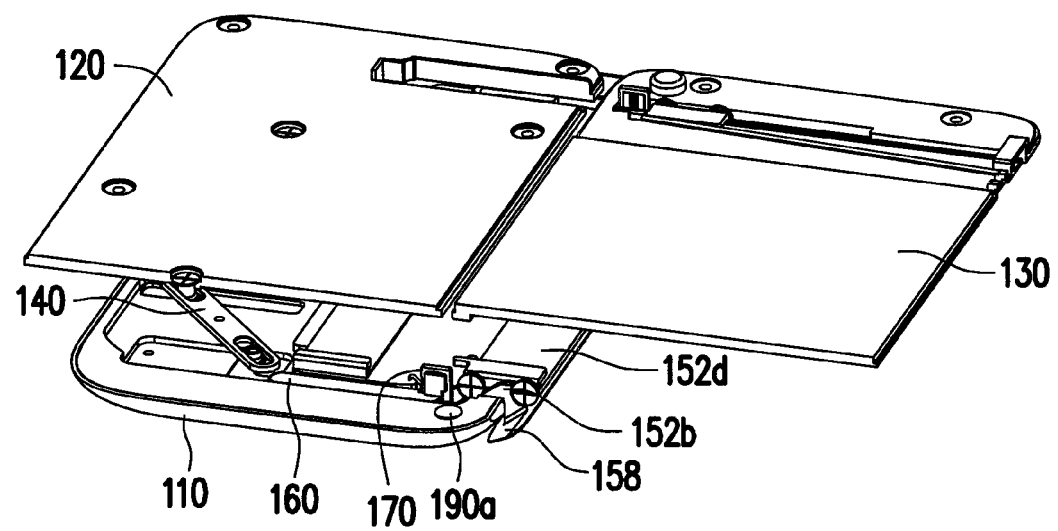
Figure 3E:
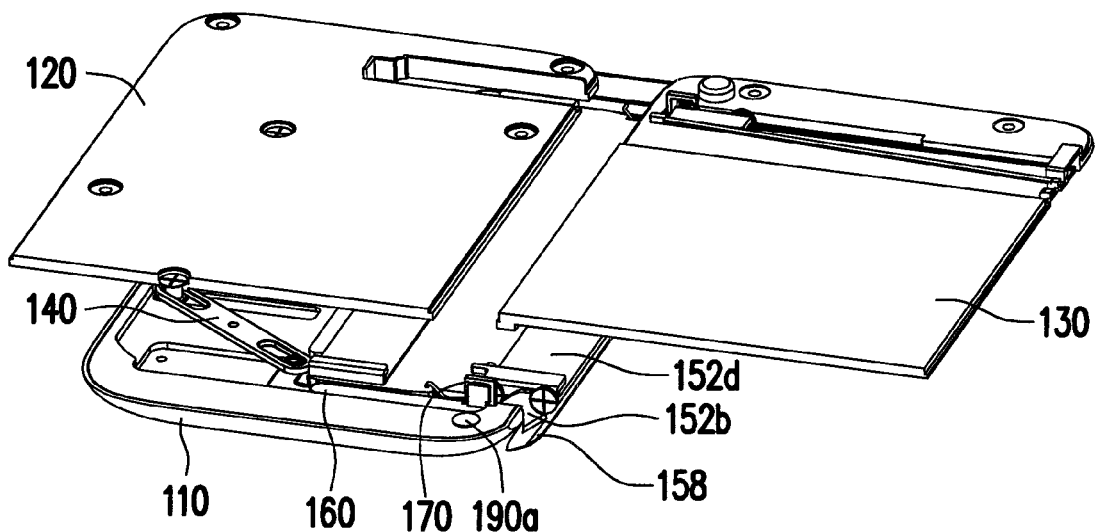
Figure 3F:
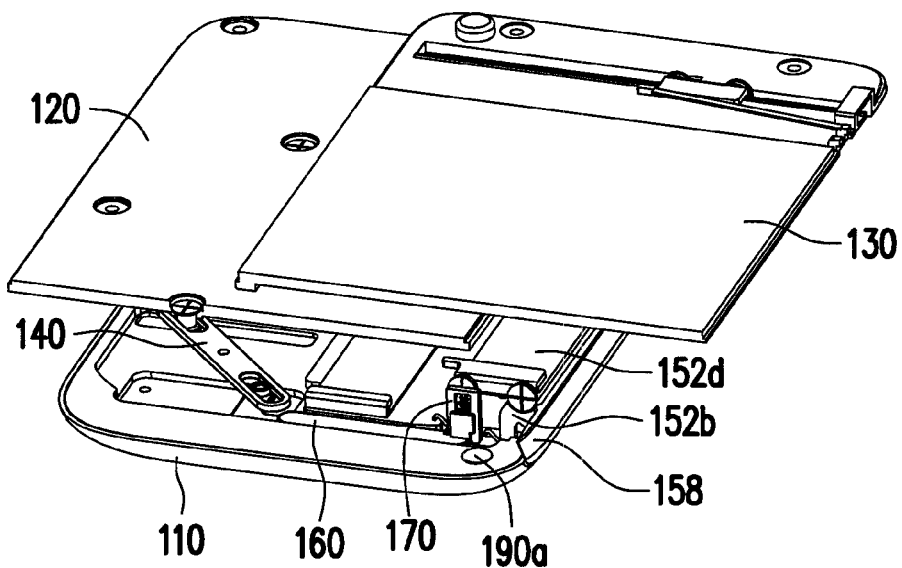
Figure 4:
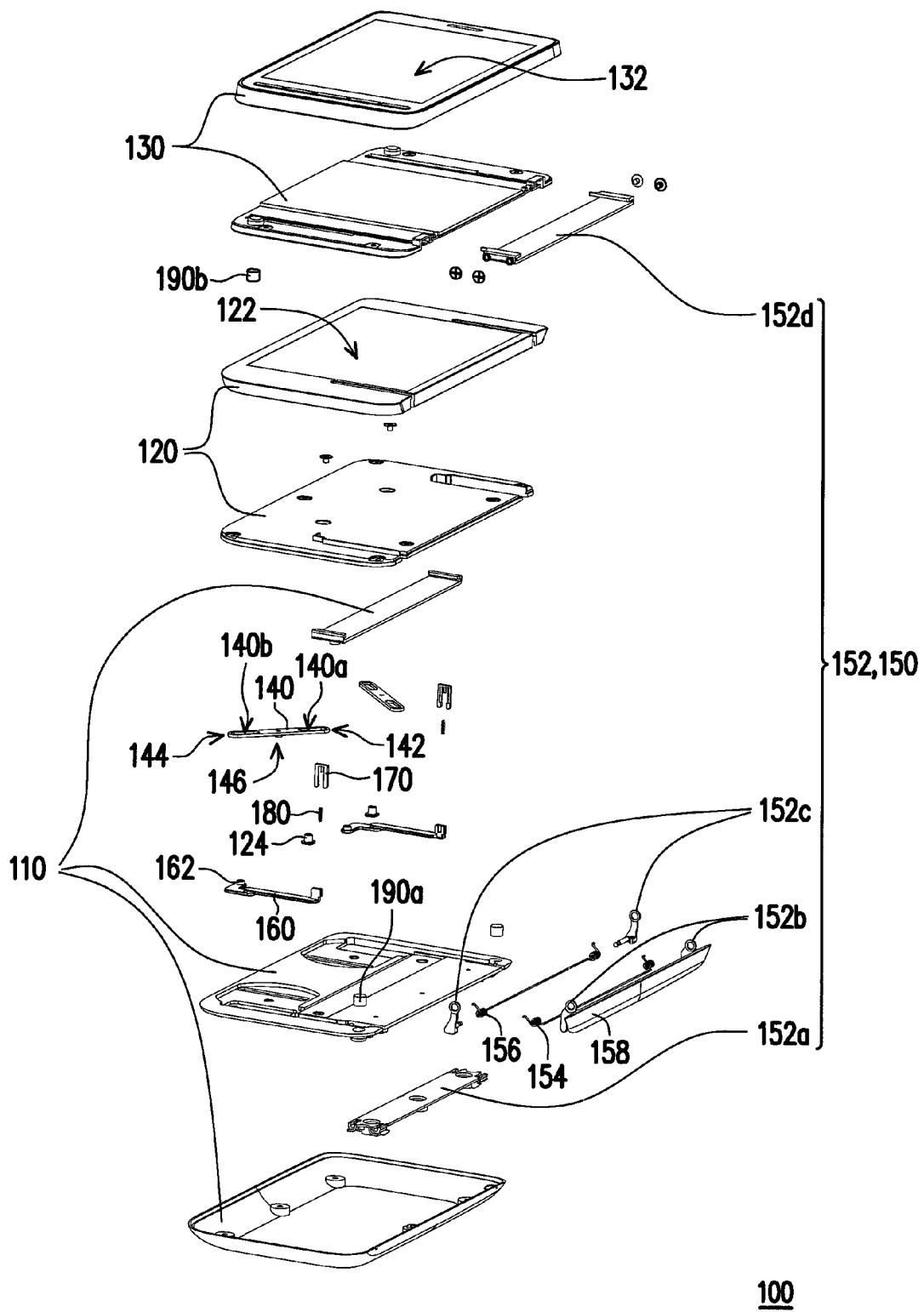
FIG. 4 is an exploded view of the handheld electronic device of FIG. 1.

When the second body 120 is completely exposed out of the third body 130, the third body 130 may be descended by the elevating mechanism 150, causing the electronic device to change from the states shown in FIG. 1C, FIG. 2C and FIG. 3C to the states shown in FIG. 1D, FIG. 2D and FIG. 3D, such that the third body 130 is moved toward the first body 110 and the handheld electronic device 100 is in a spread state. As a result, a display surface 132 of the third body 130 and a display surface 122 of the second body 120 can be joined to provide a larger display operation interface. Specifically, when the third body 130 is moved toward the first body 110 as shown in FIG. 2D, a top surface of the third body 130 is, for example, substantially coplanar with a top surface of the second body 120, such that the display surface 132 and the display surface 122 are adapted to respectively display two interactive images, each display one same image, or jointly display a complete image.

Referring to FIG. 3B and FIG. 4, in the present embodiment, the handheld electronic device 100 further includes a second rod 160 (two second rods 160 are illustrated). The second rod 160 is slidably disposed on the first body 110 and is coupled to the second end 144 of the first rod 140. The first rod 140 forms a slot 140a at the first end 142 thereof. The second body 120 includes a protruding post 124. The protruding post 24 is received in the slot 140a such that the second body 120 is coupled to the first rod 140. In addition, the handheld electronic device 100 further includes an elevating member 170 (two elevating members 170 are illustrated) and an elastic member 180 (two elastic members are illustrated). The elevating member 170 is elevatably disposed on the second rod 160. The elastic member 180 is, for example, a compression spring and is connected between the second rod 160 and the elevating member 170.

When the third body 130 moves relative to the first body 110 in the first direction D1 to the position shown in FIG. 2B, the third body 130 contacts one side of the elevating member 170. During the course of continuing movement of the third body 130 relative to the first body 110 in the first direction D1 to the position shown in FIG. 2C, the third body 130 pushes the elevating member 170 so as to drive the second rod 160 to move from the position shown in FIG. 3B to the position shown in FIG. 3C, which in turn drives the first rod 140 to pivot from the state shown in FIG. 3B to the state shown in FIG. 3C, such that the second body 120 is driven to move from the position shown in FIG. 3B to the position shown in FIG. 3C. In addition, during the course of the third body's descending and moving toward the first body 110 by means of the elevating mechanism 150, the third body 130 presses the elevating member 170 downward against the elastic force of the elastic member 180. In other words, by means of the elastic deformation characteristics of the elastic member 170, the elevating member 170 can be moved between the position shown in FIG. 2C and the position shown in FIG. 2D thus allowing the third body 130 to successfully descend.

The elevating mechanism 150 of the present embodiment includes a linkage mechanism 152 (labelled in FIG. 4). The linkage mechanism 152 is connected between the first body 110 and the third body 130 to drive the third body 130 to elevate relative to the first body 110. Specifically, the linkage mechanism 152 includes a base 152a, a first link rod 152b (two first link rods are illustrated), a second link rod 152c (two second link rods are illustrated), and an elevating board 152d. The base 152a is fixed to the first body 110. The first link rod 152b and the second link rod 152c are pivotably mounted to the base 152a. The elevating board 152d is pivotably mounted to the first link rod 152b and pivotably mounted to the second link rod 152c. The third body 130 is slidably disposed on the elevating board 152d and is therefore adapted to move relative to the first body 110 in the first operation direction D1. When the second body 120 is exposed out of the third body 130 as shown in FIG. 2C, the first link rod 152b and the second link rod 152c are adapted to pivot relative to the base 152a to drive the elevating board 152d and the third body 130 to descend to the position shown in FIG. 2D and move toward the first body 110.

Referring to FIG. 4, the elevating mechanism 150 of the present embodiment further includes an elastic member 154 and an elastic member 156. The elastic member 154 and elastic member 156 are, for example, torsion springs. The elastic member 154 is connected between the base 152a and the first link rod 152b, and the elastic member 156 is connected between the base 152a and the second link rod 152c. When the second body 120 is exposed out of the third body 130 as shown in FIG. 2C, the user may press the third body 130 downward against the elastic force of the elastic member 154 and the elastic member 156 to drive the first link rod 152b and the second link rod 152c to pivot relative to the base 152a, thus causing the third body 130 to descend and move toward the first body 110 (as shown in FIG. 2D).

When the handheld electronic device 100 is in the spread state shown in FIG. 2D, the side of the third body 130 engages against the side of the second body 120 to resist the elastic force of the elastic member 154 and the elastic member 156 and is therefore positioned at the position shown in FIG. 2D. In addition, referring to FIG. 3B and FIG. 4, the handheld electronic device 100 of the present embodiment further includes a magnetic element 190a and a magnetic element 190b. The magnetic element 190a and magnetic element 190b are, for example, magnets and are mounted to the first body 110 and the third body 130, respectively. When the third body 130 is at the position shown in FIG. 2D, the magnetic element 190a is aligned with the magnetic element 190b such that the third body 130 is further positioned by the magnetic force between the magnetic element 190a and the magnetic element 190b.

To close the handheld electronic device 100 after operation, the third body 130 may be pushed from the position shown in FIG. 2D to the position shown in FIG. 2E in the first operation direction D1, such that the third body 130 no longer engages against the second body 12 and the magnetic element 190 moves away from the magnetic element 190b. At this time, the first link rod 152b and the second link rod 152c pivot relative to the base 152a under the influence of the resilient force of the elastic member 154 and the elastic member 156 to drive the third body 130 to elevate, thus facilitating the user pushing the third body 130 to the position shown in FIG. 2F in the second operation direction D2. During the course of elevating of the third body 130, the elevating member 170 is moved upward under the influence of the elastic force of the elastic member 180. When the third body 130 is at the position shown in FIG. 2F, the third body 130 contacts the side of the elevating member 170. At this time, the user may continue to push the third body 130 to the position shown in FIG. 3A in the second operation direction D2, causing the elevating member 170 to drive the second link rod 160 and the first link rod 140 to operate, which in turn drive the second body 120 to move from the position shown in FIG. 3F to the position shown in FIG. 3A to complete the closing operation of the handheld electronic device 100.

In the present embodiment, the handheld electronic device 100 further includes a decorative plate 158. The decorative plate 158 is mounted to the first link rod 152b and positioned at one edge of the first body 110 and between the first body 110 and the third body 130 to cover the elevating mechanism 150 so as to maintain the beautiful appearance of the handheld electronic device 100.

In summary, in embodiments of the present invention, the second body is stacked between the first body and the third body. The third body can drive the second body to move by using a linkage mechanism such that the third body and the second body can move in opposite directions to expose the second body out of the third body. The third body then can descend to move toward the first body by using an elevating mechanism, such that the third body and the second body are connected to provide the handheld electronic device with a larger available display area. In addition, magnetic elements may be disposed on the first and second bodies, respectively, to provide a magnetic force to position the third body. Elastic members may further be disposed between the base and link rods of the linkage mechanism to provide an elastic force to drive the linkage mechanism to operate thus facilitating the operation of the handheld electronic device.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A handheld electronic device comprising:
   a first body;
   a first rod having a first end, a second end, and a pivot portion, wherein the pivot portion is positioned between the first end and the second end and is pivotably mounted to the first body;
   a second body slidably disposed on the first body and coupled to the first end;
   an elevating mechanism disposed on the first body; and
   a third body slidably disposed on the elevating mechanism and is coupled to the first rod, wherein the second body is stacked between the first body and the third body when the handheld electronic device is in a retracted state, when the third body moves relative to the first body in a first operation direction to drive the first rod to pivot, the second body is driven by the first rod to move relative to the first body in a second operation direction opposite to the first operation direction such that the second body is exposed out of the third body, when the second body is exposed out of the third body, the third body is descended by the elevating mechanism to move toward the first body such that the handheld electronic device turns into a spread state.

2. The handheld electronic device according to claim 1, wherein when the handheld electronic device is in the spread state, a top surface of the third body and a top surface of the second body are substantially coplanar.

3. The handheld electronic device according to claim 2, wherein the second body has a first display surface, the third body has a second display surface, when the handheld electronic device is in the spread state, the first display surface and the second display surface are adapted to respectively display two interactive images, each display one same image, or jointly display a complete image.

4. The handheld electronic device according to claim 1, wherein the first rod has a slot at the first end, the second body has a protruding post, and the protruding post is received in the slot.

5. The handheld electronic device according to claim 1, further comprising a second rod slidably disposed on the first body and coupled to the second end, wherein when the third body moves relative to the first body in the first operation direction, the third body pushes the second rod to drive the first rod to pivot.

6. The handheld electronic device according to claim 5, further comprising:
   an elevating member elevatably disposed on the second rod; and
   an elastic member connected between the second rod and the elevating member, wherein when the third body moves relative to the first body in the first operation direction, the third body pushes the elevating member to drive the second rod, when the third body is descended by the elevating mechanism to move toward the first body, the third body presses the elevating member downward against the elastic force of the elastic member.

7. The handheld electronic device according to claim 6, wherein the elastic member is a compression spring.

8. The handheld electronic device according to claim 5, wherein the first rod has a slot at the second end, the second rod includes a protruding post, and the protruding post is received in the slot.

9. The handheld electronic device according to claim 1, wherein the elevating mechanism includes a linkage mechanism connected between the first body and the third body.

10. The handheld electronic device according to claim 9, wherein the linkage mechanism comprises:
    a base fixed to the first body;
    a first link rod pivotably mounted to the base;
    a second link rod pivotably mounted to the base; and
    an elevating board pivotably mounted to the first link rod and the second link rod, wherein the third body is slidably disposed on the elevating board, and when the second body is exposed out of the third body, the first link rod and the second link rod pivot relative to the base to drive the elevating board and the third body to descend to move toward the first body.

11. The handheld electronic device according to claim 10, wherein the elevating mechanism further comprises:
    a first elastic member connected between the base and the first link rod; and
    a second elastic member connected between the base and the second link rod, wherein when the second body is exposed out of the third body, the first link rod and the second link rod pivot relative to the base against the elastic force of the first elastic member and the second elastic member, respectively, to drive the elevating board and the third body to descend to move toward the first body.

12. The handheld electronic device according to claim 11, wherein the first elastic member and the second elastic member are torsion springs.

13. The handheld electronic device according to claim 10, further comprising a decorative plate disposed at an edge of the first body and between the first body and the second body to cover the elevating mechanism.

14. The handheld electronic device according to claim 13, wherein the decorative plate is mounted to the first link rod.

* * * * *